United States Patent
Heelan et al.

(10) Patent No.: US 9,632,197 B2
(45) Date of Patent: Apr. 25, 2017

(54) SILICON CONTROLLED RECTIFIER CONTROL OF SUB-SEA TOWED ELECTROMAGNETIC SOURCE

(71) Applicant: PGS Geophysical AS, Lysaker (NO)

(72) Inventors: Philip Heelan, Asker (NO); Oliver Peppe, West Linton (GB); Mattias Südow, Solna (SE)

(73) Assignee: PGS Geophysical AS, Oslo (NO)

( * ) Notice: Subject to any disclaimer, the term of this patent is extended or adjusted under 35 U.S.C. 154(b) by 340 days.

(21) Appl. No.: 13/787,303

(22) Filed: Mar. 6, 2013

(65) Prior Publication Data

US 2014/0253129 A1    Sep. 11, 2014

(51) Int. Cl.
*G01V 3/12*    (2006.01)
*G01V 3/08*    (2006.01)

(52) U.S. Cl.
CPC ...................... *G01V 3/083* (2013.01)

(58) Field of Classification Search
CPC ................. G01V 3/12; G01V 3/083
See application file for complete search history.

(56) References Cited

U.S. PATENT DOCUMENTS

| | | | |
|---|---|---|---|
| 4,617,518 A | 10/1986 | Srnka | |
| 5,955,884 A | 9/1999 | Payton et al. | |
| 6,002,596 A * | 12/1999 | Mayer et al. | 363/21.04 |
| 6,400,119 B1 * | 6/2002 | Garza et al. | 318/798 |
| 7,187,569 B2 * | 3/2007 | Sinha et al. | 363/160 |
| 7,411,399 B2 | 8/2008 | Reddig et al. | |
| 7,642,784 B2 | 1/2010 | Reddig et al. | |
| 7,683,625 B2 | 3/2010 | Milne et al. | |
| 2006/0001428 A1 * | 1/2006 | Milne et al. | 324/360 |
| 2007/0078292 A1 * | 4/2007 | Markov | A61N 2/008 600/9 |
| 2008/0007265 A1 | 1/2008 | Milne et al. | |
| 2010/0019770 A1 | 1/2010 | Hansen | |

(Continued)

FOREIGN PATENT DOCUMENTS

BR    0603976-6    8/2007
CN    1945359    4/2007

(Continued)

OTHER PUBLICATIONS

UK Intellectual Property Office Search Report issued for application No. GB1402902.9, mailed on May 29, 2014, 3 pages.

(Continued)

*Primary Examiner* — Feba Pothen (57) ABSTRACT

A method and apparatus for generating an electromagnetic (EM) field from a sub-sea source is disclosed. In one embodiment, a sub-sea source includes a step-down transformer coupled to receive a sinusoidal source wave via a tow cable, and is further coupled to output a sinusoidal wave to a silicon-controlled rectifier (SCR) circuit. A control circuit coupled to the SCR circuit is configured to selectively activate various ones of the SCRs therein in order to control a portion of the sinusoidal wave that is rectified. The output current provided by the SCR is determined by the portion of the sinusoidal wave that is rectified thereby. The output current is provided to electrodes coupled to the sub-sea source, and the output current is passed therebetween. The strength of the EM field is based on the output current.

16 Claims, 9 Drawing Sheets

(56) References Cited

U.S. PATENT DOCUMENTS

2010/0181307 A1* 7/2010 Richardson .................. 219/717
2010/0256786 A1 10/2010 Jung
2012/0223718 A1 9/2012 Peppe et al.

FOREIGN PATENT DOCUMENTS

| FR | 2891629 | 4/2007 |
|---|---|---|
| GB | 2402745 | 12/2004 |
| GB | 2427482 | 12/2006 |
| GB | 2431474 | 5/2008 |
| WO | 2004053528 | 6/2004 |

OTHER PUBLICATIONS

S. Constable et al., "Marine Controlled-source Electromagnetic Sounding 2. The PEGASUS Experiment", Journal of Geophysical Research, vol. 101, No. B3, pp. 5519-5530, Mar. 10, 1996, Scripps Institution of Oceanography, University of California San Diego, La Jolla.
Johan Mattsson, et al., "Error Analysis and Capability Modelling for Towed Streamer Electromagnetics," First Break, Aug. 2012, pp. 91-96, vol. 30.
Johan Mattsson, et al., "Towed Streamer EM: The Challenges of Sensitivity and Anisotropy" First Break, Jun. 2013, pp. 155-159, vol. 31.
Chris Anderson, et al., "An Integrated Approach to Marine Electromagnetic Surveying Using a Towed Streamer and Source" First Break, May 2010, pp. 71-75, vol. 28.

* cited by examiner

SILICON CONTROLLED RECTIFIER CONTROL OF SUB-SEA TOWED ELECTROMAGNETIC SOURCE

BACKGROUND

1. Technical Field

This disclosure relates to marine electromagnetic (EM) surveys, and more particularly, to the control of an EM source used in a marine EM survey.

2. Description of the Related Art

Marine electromagnetic (EM) surveys are a relatively new technique used in energy exploration. In a marine EM survey, a sub-sea EM source may be towed in the water by a tow vessel. The sub-sea EM source may be towed at a depth that may vary with the portion of the sea or ocean in which the exploration is conducted. The EM source may transmit electrical current through the water between two electrodes, thereby producing an EM field. Distortions in the field may indicate the presence of valuable deposits, such as oil deposits, natural gas deposits, and so on. A response obtained during the conducting of an EM survey may be compared with various baselines to determine if any such distortions correspond to valuable deposits.

In addition to the sub-sea source, the tow vessel may include a significant amount of equipment used to generate the electrical energy for the resulting EM field. Equipment on a tow vessel may include a high power frequency converter coupled to the vessel's power source. The frequency converter may provide a regulated low-voltage alternating current (HVAC) output. The frequency converter may also be synchronized to a global positioning system (GPS) receiver, and thus its output may vary with a geographic location. A step-up transformer on the vessel may be used to increase the voltage (and thus, decrease the current). The output signal from the transformer may be transmitted via tow cable to the sub-sea EM source, wherein the voltage may be reduced by a step-down transformer, and the resulting current may be transmitted between two electrodes in order to produce the desired EM field.

BRIEF DESCRIPTION OF THE DRAWINGS

Other aspects of the disclosure will become apparent upon reading the following detailed description and upon reference to the accompanying drawings, which are now described as follows.

While the subject matter disclosed herein is susceptible to various modifications and alternative forms, specific embodiments thereof are shown by way of example in the drawings and will herein be described in detail. It should be understood, however, that the drawings and description thereto are not intended to be limiting to the particular form disclosed, but, on the contrary, is to cover all modifications, equivalents, and alternatives falling within the spirit and scope of the present disclosure as defined by the appended claims.

DETAILED DESCRIPTION

Figure 1:
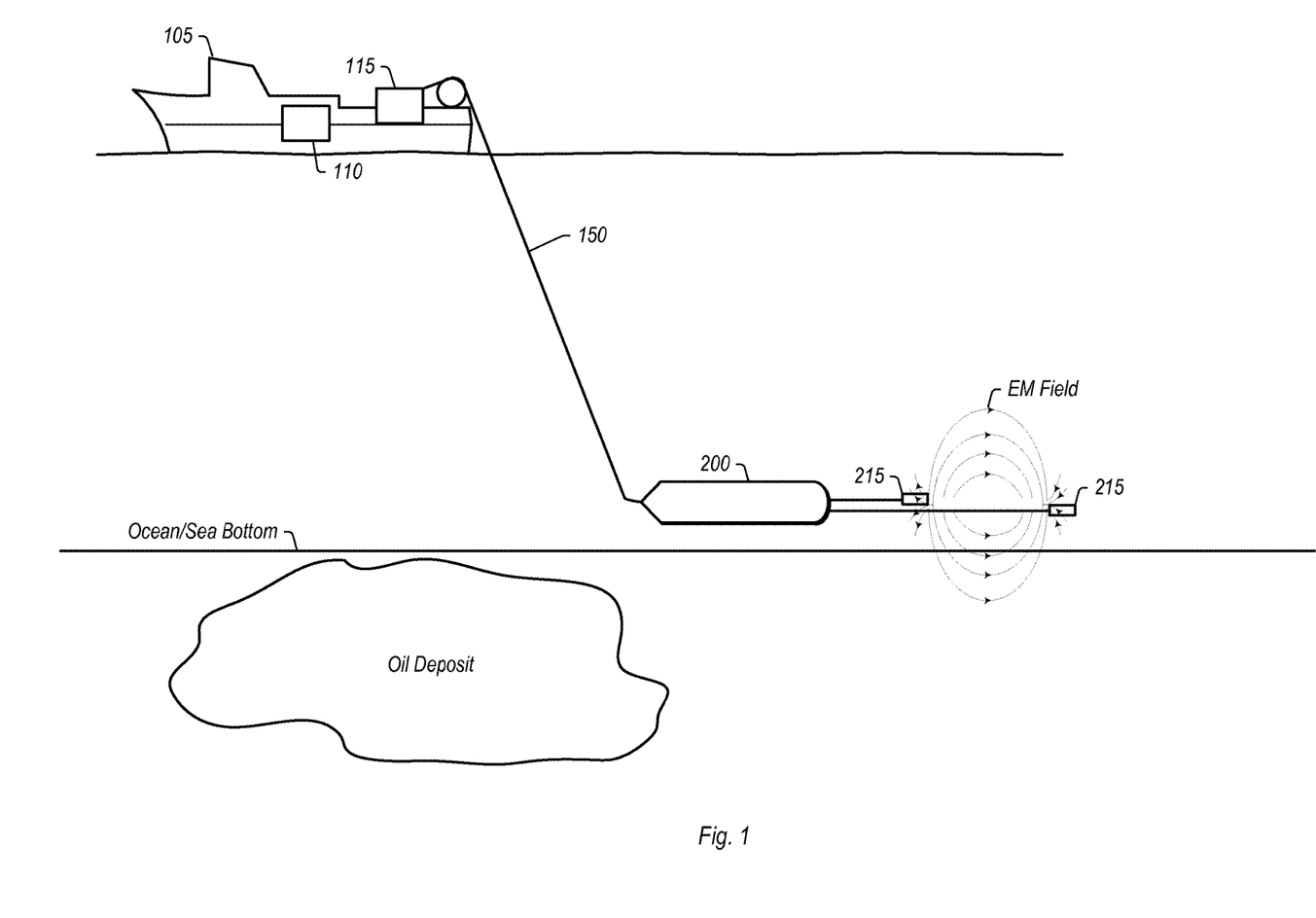
FIG. 1 is a diagram illustrating a tow vessel towing one embodiment of a sub-sea electromagnetic (EM) source.

Turning now to FIG. 1, a diagram illustrating a tow vessel towing one embodiment of a sub-sea electromagnetic (EM) source. The sub-sea EM source may be used for various types of surveys, such as those used the exploration for hydrocarbon energy deposits. In the embodiment shown, a tow vessel 105 on the surface of a body of water (e.g., an ocean, a sea, etc.) is towing a sub-sea EM source 200 in order to conduct a sub-sea EM survey. Sub-sea source 200 in the embodiment shown is coupled to tow vessel 105 via a tow cable 150. Tow vessel 105 includes a step-up transformer 115 coupled to receive power from a ship's power source 110. Step-up transformer 115 is configured to step-up the voltage of the received ship's power. A resultant sinusoidal source wave is transmitted from step-up transformer 115 at a higher voltage (but a lower current) than at which it was received from the ship's power source.

Tow cable 150 includes an electrical connection between step-up transformer 115 and sub-sea source 200. As discussed below, the power received at sub-sea source 200 may pass through a step-down transformer and other circuitry. Sub-sea source in the embodiment shown includes a pair of electrodes 215. The electrodes 215 may trail the main body of sub-sea source 200 at different distances. In some embodiments (not shown), the electrodes 215 may form a dipole disposed transverse to the direction of towing, thereby trailing the main body of sub-sea source 200 at approximately the same distance. Electrical current, output from sub-sea source 200, may pass through the seawater between the electrodes 215, thereby generating an EM field. Sub-sea source 200 may be towed at a depth sufficiently close to the ocean/sea bottom that distortions in the EM field caused by an oil deposit (or other type of deposit, e.g., natural gas) can be detected by equipment.

Although not shown here, tow vessel 105 may include equipment for control of and communications with sub-sea source 200. Such equipment may facilitate the sending of commands to sub-sea source 200 to perform different functions, such as varying and controlling the output current used to generate the EM field. Similarly, sub-sea source 200 may include equipment to gather survey data and relay this data back to tow vessel 105 to enable personnel thereon to make initial assessments with regard to the survey in progress.

Figure 2:
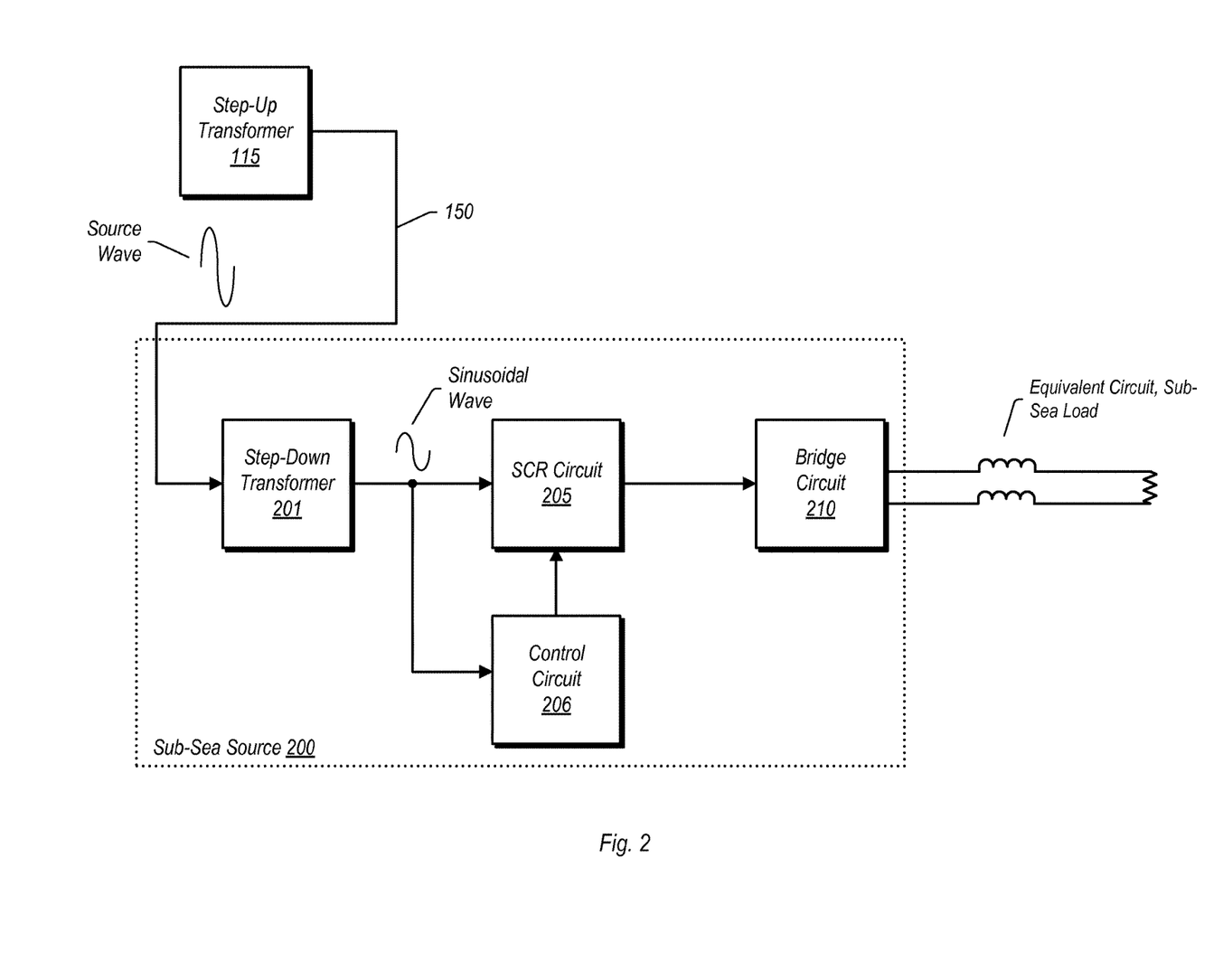
FIG. 2 is a top-level schematic illustrating one embodiment of a sub-sea EM source.

FIG. 2 is a block diagram illustrating one embodiment of a sub-sea EM source. In the embodiment shown, sub-sea source 200 includes a step-down transformer 201 coupled to receive a source wave transmitted by step-up transformer 115 (on tow vessel 105) through tow cable 150. Step-down transformer 201 is configured to reduce the voltage (while correspondingly increasing the current) of the power received in the source wave to produce a resultant sinusoidal wave. The resultant sinusoidal wave is then passed to both a silicon controlled rectifier (SCR) circuit 205 and a control circuit 206.

SCR circuit 205, as further discussed below, may include a number of SCRs and is configured to control the amount of current output from sub-sea source 200. Control of the amount of output current by SCR circuit 205 may be accomplished by varying a portion of the sinusoidal wave that is rectified. Any non-zero portion of the sinusoidal wave, up to and including 100 percent thereof, may be rectified by SCR circuit 205 to produce a corresponding non-zero output current. Generally speaking, the amount of output current provided by SCR circuit 205 may increase with the amount of the sinusoidal wave that is rectified. Accordingly, the maximum amount of output current that can be provided by SCR circuit for a given sinusoidal wave may correspond to rectification of the entirety of that sinusoidal wave. As the amount of the sinusoidal wave that is rectified is reduced, the amount of output current provided by the SCR circuit is correspondingly reduced.

The portion of the sinusoidal wave that is rectified in the embodiment shown is determined by control circuit 206. Control circuit 206 may selectively activate particular ones of the SCRs in SCR circuit 205 at particular times to cause portions of the sinusoidal wave to be rectified. In one embodiment, SCR circuit 205 may include a number of SCRs divided into first and second subsets. Control circuit 206 may provide a first control signal to respective gate terminals in a first subset of SCRs during a first portion (e.g., positive phase) of the sinusoidal wave. A second control signal may be provided by control circuit 206 to respective gate terminals of a second subset of SCRs during a second portion of the sinusoidal wave (e.g., negative phase). Control circuit 206 may determine the point at which it asserts the first and second control signals, and thereby the portion of the sinusoidal wave that is rectified. To this end, control circuit 206 may include a zero-crossing detector to determine when the sinusoidal wave crosses the zero point, both in the positive and negative directions.

The resulting rectified portion of the sinusoidal wave output by SCR circuit may have an average current value, and may be received by bridge circuit 210. In one embodiment, bridge circuit 210 may be an H-bridge circuit. In other embodiments, other suitable and well-known types of bridge circuits may be used to implement bridge circuit 210.

FIG. 2 as illustrated herein does not explicitly show the electrodes 215 and their corresponding cables, but instead illustrates an equivalent circuit formed thereby. Each of the cables coupled between the main body of sub-sea source 200 and the electrodes may have an inherent inductance (represented by the inductors shown in the circuit), with the longer cable having the greater amount. These inductances provide some filtering that results in a smoother output current signal. The resistor in the equivalent circuit may represent the resistance of seawater between the two electrodes, which may have a very small non-zero value (e.g., less than 1 ohm, in some embodiments).

Figure 3:
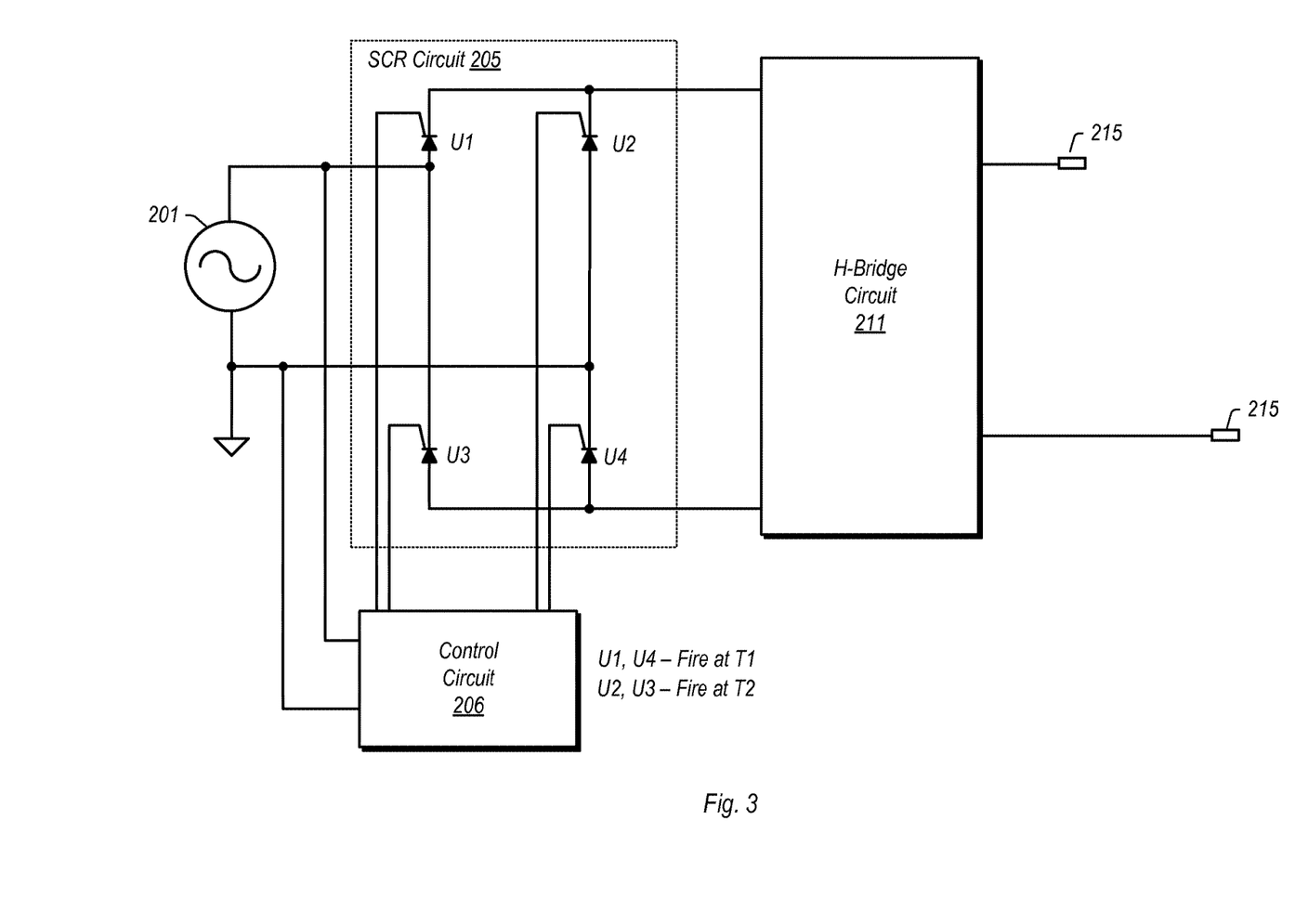
FIG. 3 is a circuit diagram illustrating one embodiment of a silicon-controlled rectifier (SCR) circuit in a sub-sea source.

FIG. 3 is a circuit diagram illustrating one embodiment of a silicon-controlled rectifier (SCR) circuit in a sub-sea source. In the embodiment shown, SCR circuit 205 includes four SCRs, U1, U2, U3, and U4. Each of the SCRs includes a gate terminal coupled to control circuit 206. The four SCRs in the embodiment shown are divided into two subsets, a first one including SCRs U1 and U4 and a second subset including U2 and U3. At time T1, within the cycle of the input sinusoidal wave received from step-down transformer 201, control circuit 206 asserts a control signal to the gate terminals of U1 and U4, thereby activating those devices (with U2 and U3 remaining inactive). When U1 and U4 are active (i.e. conducting), a first portion of the sinusoidal wave received from transformer 201 is rectified. When control circuit 206 detects the zero crossing of the sinusoidal wave, the control signal provided to the gate terminals of U1 and U4 are de-asserted. At a time T2, control circuit 206 asserts a control signal to the gate terminals of U2 and U3, activating those devices and causing them to conduct. A second portion of the sinusoidal wave is rectified when U2 and U3 are conducting. Responsive to the next detection of the zero crossing of the sinusoidal wave, control circuit 206 de-asserts the controls signals provided to the gate terminals of U2 and U3. At this point, none of the SCRs conduct until T1 of the next cycle, when U1 and U4 are again activated.

Figure 4:
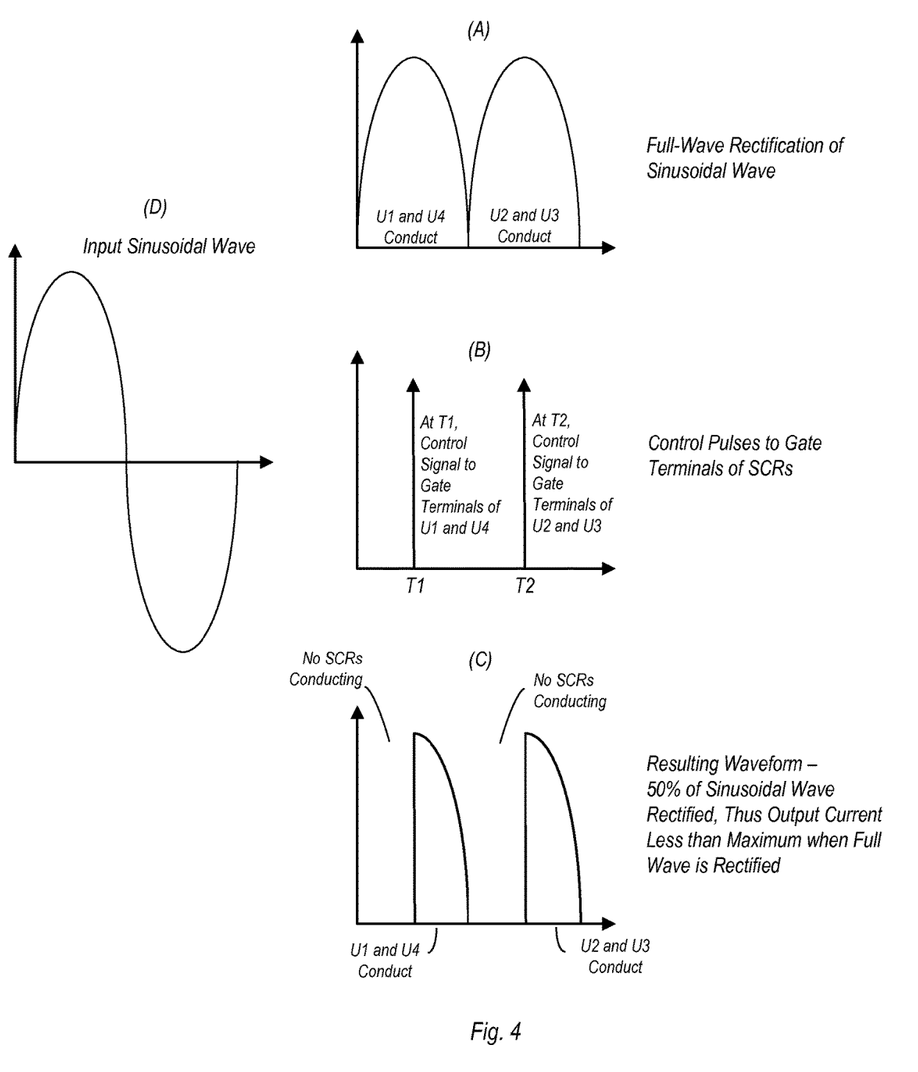
FIG. 4 is a graphic illustrating the operation of one embodiment of an SCR circuit.

FIG. 4 is a graphic illustrating the operation of one embodiment of an SCR circuit. In the example shown, a sinusoidal wave (D) as shown serves as an input wave to the SCR circuit. In (A), the full wave is rectified. That is, U1 and U4 are conducting during the positive portion of the wave, while U2 and U3 conduct during the negative portion of the wave. To rectify the full wave, control circuit 206 may assert control signals to the gate terminals of U1 and U4 responsive to the positive-going zero crossing of the sinusoidal wave, and assert the control signals to the gate terminals of U2 and U3 at the negative-going zero crossing of the sinusoidal wave. Thus, T1 in this example is at the positive-going zero crossing and T2 is at the negative-going zero crossing. It is noted that at T2, U1 and U4 are deactivated, while U2 and U3 are deactivated at T1.

In (B), T1 and T2 have been shifted to approximately the center of their respective phases. The resultant waveform is shown in (C). Between the beginning of the cycle shown (which starts that the positive-going zero crossing of the input sinusoidal wave), none of the SCR conduct. At T1, control circuit 206 asserts control signals to the gate terminals of U1 and U4, thereby activating these devices. U1 and U4 then conduct, and pass remaining positive portion of the sinusoidal wave, which is approximately 50% in this example. Responsive to the negative-going zero crossing of the sinusoidal wave, control circuit 206 de-asserts the control signals provided to the gate terminals of U1 and U4, and once again no SCRs are conducting. At T2, approximately halfway through the negative phase of the sinusoidal wave, control circuit 206 asserts control signals to the gate terminals of U2 and U3, thereby activating these devices. When U2 and U3 are conducting, remaining negative portion of the sinusoidal wave (approximately 50%) is rectified. Thus, overall, 50% of the entire sinusoidal wave is rectified, and thus the output current in this less than the maximum value.

In general, the output current provided by SCR circuit 205 varies with the amount of the sinusoidal wave that is rectified and passed through to bridge circuit 211. The average output current may be found by integrating, over time, the resultant wave output from SCR circuit 205. Thus, in some embodiments, the more of the sinusoidal wave that is rectified, the higher the output current provided by SCR circuit 205. The amount of the sinusoidal wave that is rectified may be varied by varying the times T1 and T2 when control signals are asserted on the gate terminals of the first and second sets of SCRs, respectively.

Figure 5:
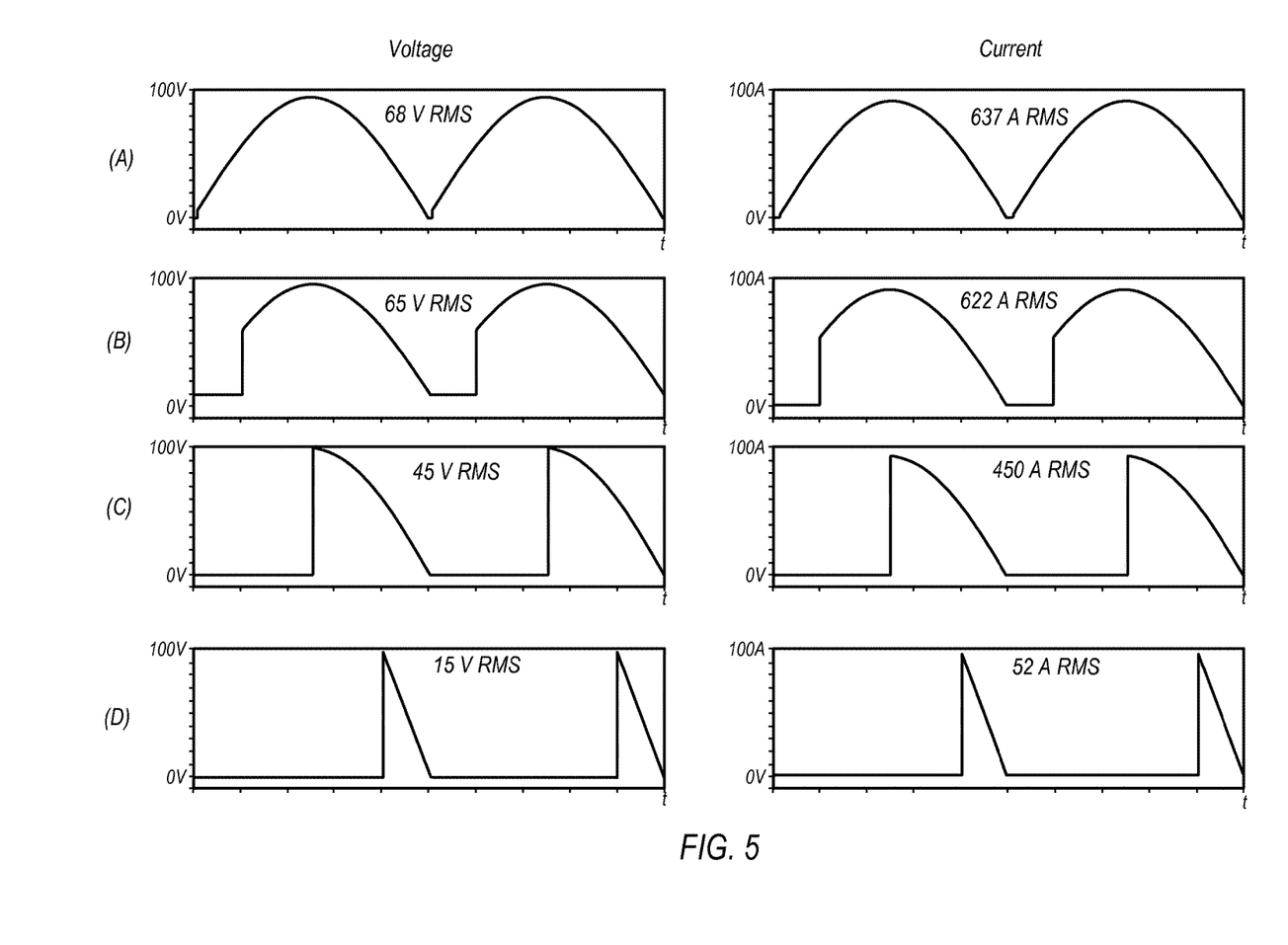
FIG. 5 is a graphic illustrating variations in the output current provided by one embodiment of an SCR circuit based on a portion of a sinusoidal wave rectified thereby.
Figure 6:
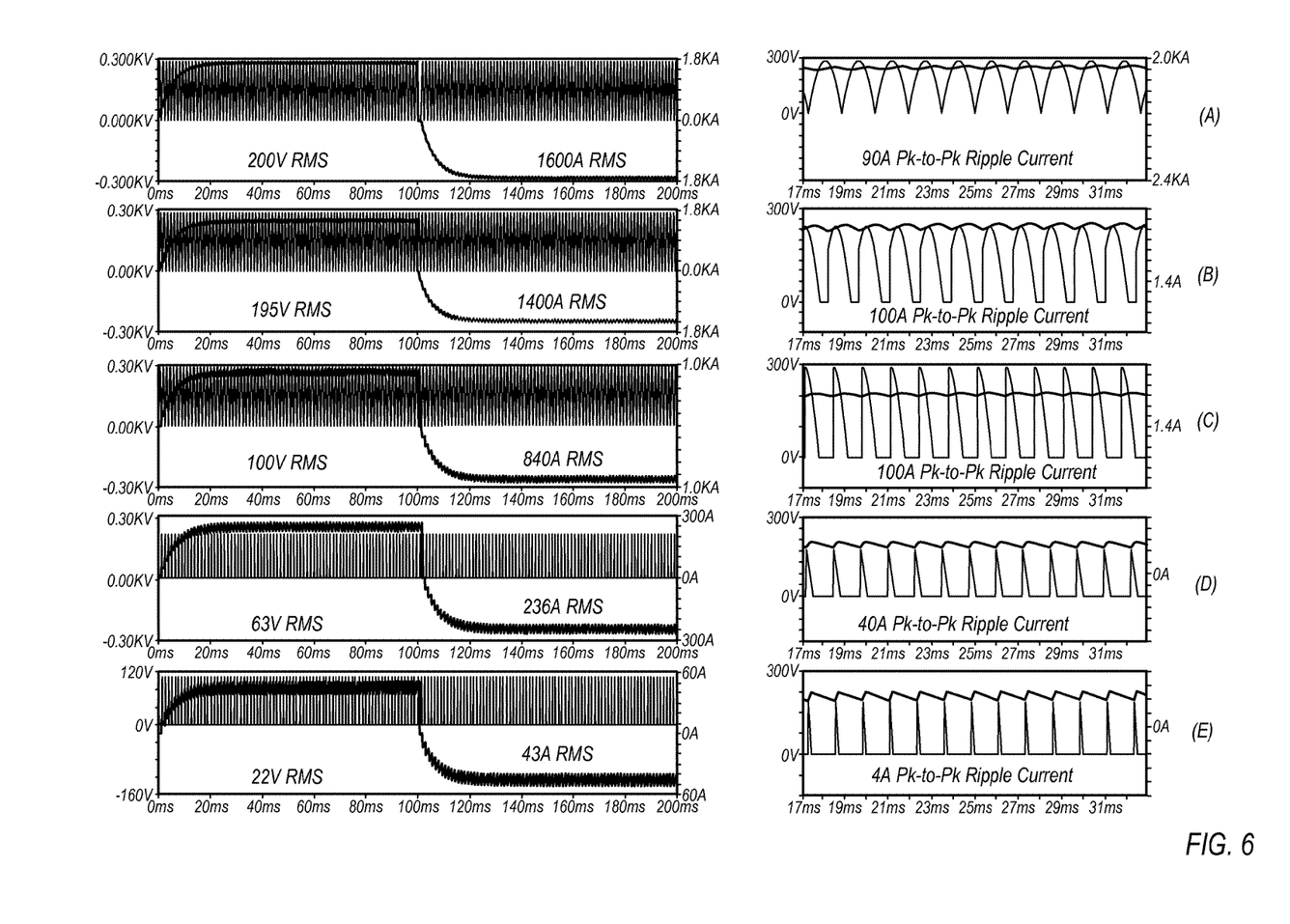
FIG. 6 is a graphic illustrating variations in the output current provided by an embodiment of an SCR circuit based on a portion of a sinusoidal wave rectified thereby.

FIGS. 5 and 6 illustrate the results of simulations of various embodiments of an SCR circuit. In FIG. 5 (A), full-wave rectification of a 100V peak-to-peak sinusoidal wave results in a voltage of 68 volts (V) root-mean-squared (RMS) and a current 637 amperes (A) RMS. This scenario corresponds to control circuit asserting the control signals at the zero crossings as described above. The next example, FIG. 5 (B) corresponds to asserting the control signals 30 degrees (in phase) subsequent to the zero crossings, resulting in an output voltage of 65 V RMS and 622 A RMS. The third example, FIG. 5 (C) corresponds to asserting the control signals 90 degrees subsequent to the zero crossing, resulting in an output voltage of 45 V RMS and an output current of 450 A RMS. The fourth and final example, FIG. 5 (D) corresponds to asserting the control signals 150 degrees subsequent to the zero crossings, with an output voltage of 15 V RMS and an output current of 52 A RMS.

The simulation results from FIG. 6 are based on a peak-to-peak voltage of 300V, with a maximum output current of 1600 A RMS. The simulation shown here factors in the inductance of the load provided by the cables coupled between the main body of sub-sea source 200 and the electrodes 215. An expanded x-axis view is provided in the right-hand column for each of the simulations.

At full wave rectification in FIG. 6 (A), the output voltage is 200 V RMS and the output current is 1600 A RMS, with a 90 A peak-to-peak ripple on the output current. With the output voltage reduced to 195 V RMS in FIG. 6 (B), the output current is reduced to 1400 A RMS, with a 100 A peak-to-peak ripple current. At 100 V RMS as illustrated in FIG. 6 (C), the output current is 840 A RMS, also with a 100 A peak-to-peak ripple current. At 63 V RMS as illustrated in FIG. 6 (D), the output current is 236 A RMS with a 40 A peak-to-peak ripple current. At 22 V RMS as illustrated in FIG. 6 (E), the output current is 43 A RMS, with a 4 A peak-to-peak ripple current.

Figure 7:
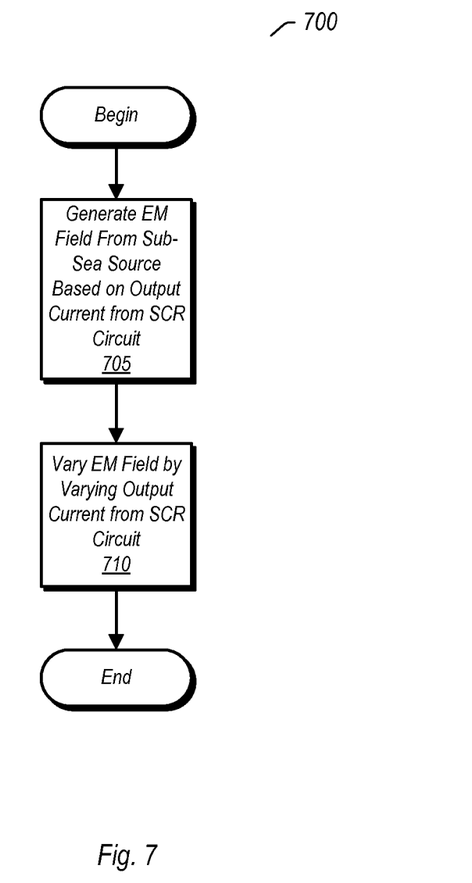
FIG. 7 is a flow diagram illustrating one embodiment of a method for varying an EM field generated by a sub-sea source having an SCR circuit.

Turning now to FIG. 7, a flow diagram illustrating one embodiment of a method for varying an EM field generated by a sub-sea source having an SCR circuit is shown. Method 700 includes the generation of an electromagnetic field from a sub-sea source, wherein the EM field is based on an output current from an SCR circuit (block 705). Variations of the embodiments described above may be used to generate the EM field. Method 700 further includes varying the EM field by varying the output current from the SCR circuit (block 710). Using one of the embodiments described above or variations thereof, the output current may be varied by varying the amount of an input sinusoidal wave that is rectified. A maximum amount of current may be generated by rectifying the entirety of the sinusoidal wave. A reduced amount of current may be generated by rectifying a portion of the sinusoidal wave that is less than its entirety. The method thus contemplates the ability to change the output current by changing the portion of the sinusoidal wave that is rectified, with an upper limit set by the current resulting from rectifying the full wave.

Figure 8:
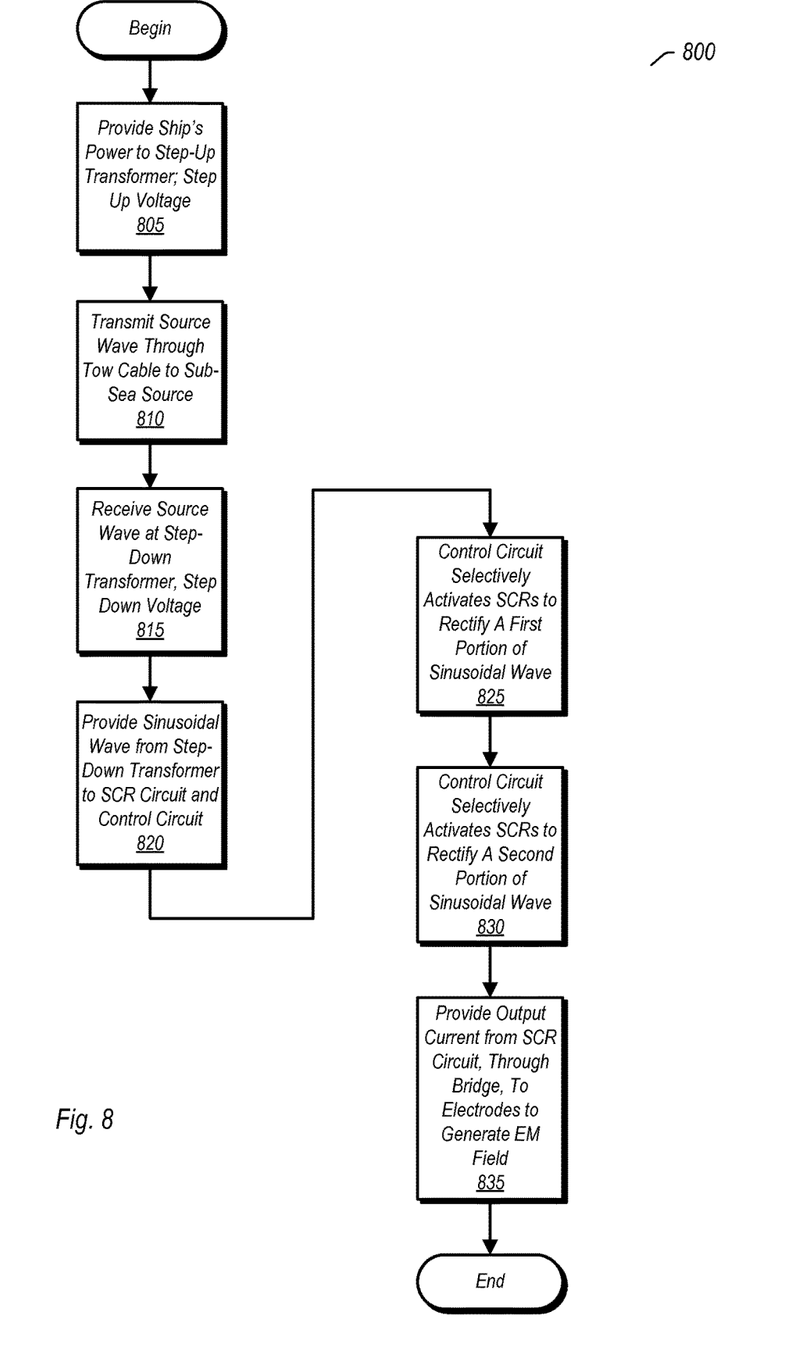
FIG. 8 is a flow diagram illustrating one embodiment of a method for operating a sub-sea source to generate an EM field, wherein the sub-sea source includes an embodiment of an SCR circuit.

FIG. 8 is a flow diagram illustrating one embodiment of a method for operating a sub-sea source to generate an EM field, wherein the sub-sea source includes an embodiment of an SCR circuit. Method 800 may be performed by the apparatus embodiments discussed above, as well as by variations thereof and other apparatus embodiments not explicitly discussed herein.

Method 800 begins with the provision of power from a ship's power source in a tow vessel to a step-up transformer in which the voltage of the received power is increased (block 805). The output power at the greater voltage (and reduced current) may be transmitted as a source wave through an electrical conductor in a tow cable coupled to a sub-sea source (block 810). The sub-sea source may receive the source wave at a step-down transformer included therein, thereby stepping down the voltage of the received power (block 815). The sinusoidal wave output from the step-down transformer may be provided to both an SCR circuit and a control circuit (block 820). It is noted that while the discussion here is in the context of a single phase sinusoidal wave, it is noted that embodiments are possible and contemplated wherein power provided from the ship's power source (and thus used to generate the EM field at the sub-sea source) may be three-phase power. Accordingly, the single phase examples used herein are not intended to be limiting.

The control circuit may detect the zero crossings of the sinusoidal wave, and based on these, generate the timing for control signals. These control signals may be generated by the control circuit to selectively activate SCRs in the SCR circuit to rectify a portion of the sinusoidal wave. A first set of SCRs may be activated to rectify a first portion of the sinusoidal wave (block 825), followed by the activation of a second set of SCRs to rectify a second portion of the sinusoidal wave (block 830). The control circuit may activated and deactivate the first and second sets of SCRs such that their activation times are non-overlapping. The amount of the sinusoidal wave that is rectified may be determined by the timing of the control signals. The control signals may be timed to rectify the entirety of the sinusoidal wave, or may be timed to rectify any non-zero portion of the sinusoidal wave that is less than the entirety. Varying the amount of the sinusoidal wave that is rectified may thus vary the amount of output current provided by the SCR circuit. The output current from the SCR circuit may be provided, via a bridge circuit, to electrodes trailing the main body of the sub-sea source, thereby generating an EM field (block 835).

Variations of the embodiments described above are possible and contemplated. For example, in one variation, uncontrolled rectifier devices (e.g., diodes) may be used in place of some SCRs in an SCR circuit to implement a semi-controlled rectifier circuit. Numerous other variations are also possible and contemplated. Furthermore, while the SCR circuit discussed above has been used primarily to set the amount of output current provided to generate the EM field, it is noted that the SCR circuit may also be used to discontinue generation of the EM field by holding all SCRs in an inactive state. This allows the EM field to be shut down either by discontinuing the provision of ship's power to the step-up transformer or by inhibiting any output current from being provided by the SCR circuit.

Figure 9:
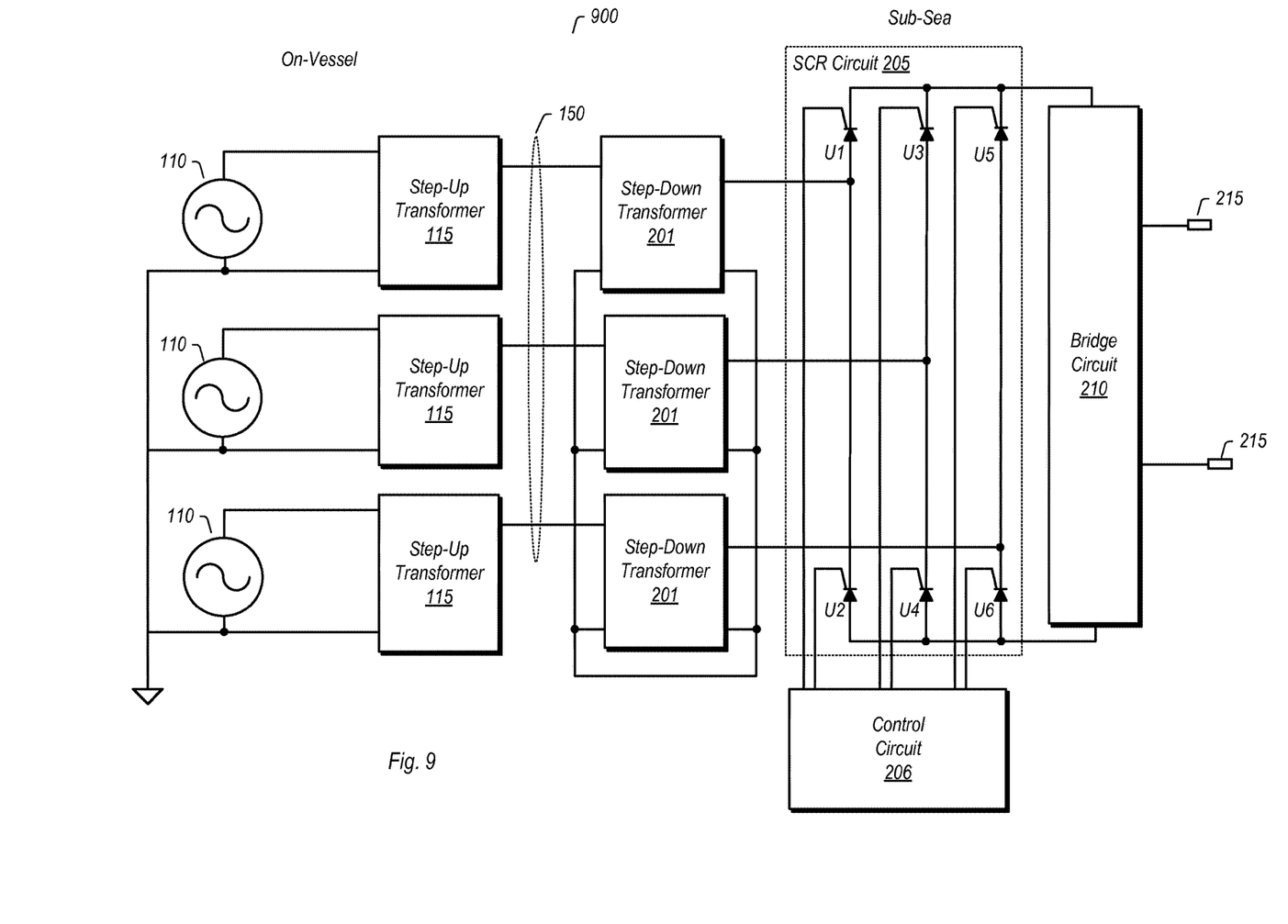
FIG. 9 is a block diagram illustrating one embodiment of a three-phase system using an SCR circuit in a sub-sea source.

Turning now to FIG. 9, a block diagram illustrating one embodiment of a three-phase system using an SCR circuit in a sub-sea source is shown. System 900 as shown in FIG. 9 is similar to the systems shown in FIGS. 2 and 3, with the exception that it is extended to three phases. On board the survey vessel, three generators 110 (or, alternatively, a single, three-phase generator) provide power in three phases (e.g., 120° apart). The power is then fed to step-up transformers 115, which step up the voltage and transmit it through tow cable 150. At the sub-sea source, the three-phase power received via tow cable 150 is then stepped down in voltage by step-down transformers 201. From step-down transformers 201, the three phases of power are conveyed to SCR circuit 205, which in this embodiment is configured for receiving three-phase power. Each phase of power may be rectified in a manner similar to that shown in FIG. 4 or 5. The three phase power is then provided to bridge circuit 210, and the average current output therefrom produces an electric field between electrodes 215.

Numerous variations and modifications will become apparent to those skilled in the art once the above disclosure is fully appreciated. It is intended that the following claims be interpreted to embrace all such variations and modifications.

What is claimed is:

1. An apparatus comprising:
   a sub-sea electromagnetic (EM) source configured to generate an EM field, wherein the sub-sea EM source includes:
      a silicon controlled rectifier (SCR) circuit configured to rectify a selected portion of a sinusoidal wave to produce an output current used to generate the EM field;
      a control circuit configured to activate the SCR circuit at a time difference relative to a zero-crossing point of the sinusoidal wave, such that the selected portion subsequent to each zero-crossing is less than a half-sinusoidal portion of the sinusoidal wave and wherein the control circuit is further configured to vary the output current by varying an amount of the time difference between different activations of the SCR circuits for the sinusoidal wave; and
      a pair of electrodes configured to use the output current to generate the EM field.

2. The apparatus as recited in claim 1, wherein the sub-sea EM source further includes a step-down transformer configured to output the sinusoidal wave at a first root-mean-squared (RMS) voltage based on a sinusoidal source wave received at a second RMS voltage greater than the first RMS voltage.

3. The apparatus as recited in claim 2, wherein the step-down transformer is coupled to receive the sinusoidal source wave via a cable that is further coupled to a step-up transformer on a tow vessel, wherein the step-up transformer is configured to produce the sinusoidal source wave.

4. The apparatus as recited in claim 1, wherein the SCR circuit includes a plurality of SCRs, and wherein the control circuit is configured to activate a first subset of the SCRs at a first time and a second subset of the SCRs at a second time that is non-overlapping with the first time.

5. The apparatus as recited in claim 3, wherein the control circuit is coupled to receive the sinusoidal wave, wherein the control circuit is configured to provide respective control signals to each of the SCRs based on determining the zero-crossing points of the sinusoidal wave.

6. A method comprising:
   generating, in a sub-sea electromagnetic (EM) source, an EM field based on an output current provided by a silicon controlled rectifier (SCR) circuit, wherein said generating is performed by providing the output current to a pair of electrodes; and
   varying the EM field by varying the output current of the SCR circuit, wherein varying the output current of the SCR circuit includes varying a portion of a sinusoidal wave rectified by the SCR circuit such that less than a half-sinusoidal amount of the sinusoidal wave, subsequent to a zero-crossing point of the sinusoidal wave, is rectified, wherein varying a portion of the sinusoidal wave rectified by the SCR circuit comprises varying a time difference, relative to zero-crossing points of the sinusoidal wave, at which SCRs of the SCR circuit are activated.

7. The method as recited in claim 6, wherein varying the output current of the SCR circuit comprises rectifying the entirety of the sinusoidal wave.

8. The method as recited in claim 6, wherein the SCR circuit includes a plurality of SCRs, and wherein the method further comprises activating a first subset of the plurality of SCRs at a first time for a first duration and activating a second subset of the plurality of SCRs at a second time for a second duration that is non-overlapping with the first duration.

9. The method as recited in claim 6, further comprising receiving, at the SCR circuit, the sinusoidal wave from a step-down transformer coupled to receive a sinusoidal source wave.

10. An apparatus comprising:
    a sub-sea electromagnetic (EM) source configured to generate an EM field based on an output current provided by a silicon controlled rectifier (SCR) circuit in response to receiving a sinusoidal wave, wherein the sub-sea EM source includes a pair of electrodes coupled to receive the output current, and wherein the EM field is generated by the output current flowing between a first one of the pair of electrodes and a second one of the pair of electrodes; and
    a control circuit configured to vary the EM field by causing a variation in the output current provided by the SCR circuit by causing activation of the SCR circuit at a time difference relative to a zero-crossing point of the sinusoidal wave such that less than a half-sinusoidal portion of the sinusoidal wave is rectified subsequent to a zero-crossing point.

11. The apparatus as recited in claim 10, wherein the SCR circuit includes a plurality of SCRs, and wherein the control circuit is configured to activate selected ones of the plurality of SCRs independent of other ones of the plurality of SCRs.

12. The apparatus as recited in claim 11, wherein the plurality of SCRs includes a first subset and a second subset of SCRs, and wherein the control circuit is configured to:
    activate the first subset of SCRs during a first portion of the sinusoidal wave;
    activate the second subset of SCRs during a second portion of the sinusoidal wave, wherein the control circuit is configured to prevent the first and second subsets of SCRs from being concurrently active; and
    deactivate the first and second subset of SCRs during a third portion of the sinusoidal wave, wherein the SCR circuit is configured to provide the output current only when one of the first or second subsets of SCRs is active.

13. A method comprising:
    towing a sub-sea electromagnetic (EM) source in water behind a survey vessel;
    generating an EM field in the water using the sub-sea EM source, wherein said generating comprises:
      rectifying a selected portion of a sinusoidal wave to produce an output current used to generate the EM field, wherein said rectifying is performed by a silicon controlled rectifier (SCR) circuit, wherein the selected portion that is rectified of each half-sinusoid of the sinusoidal wave is less than an entirety of the half-sinusoid;
      determining, using a control circuit, the selected portion of the sinusoidal wave that is rectified by the SCR circuit;
      varying the output current by varying a time difference, relative to zero-crossing points of the sinusoidal wave, at which SCRs of the SCR circuit are activated; and
      generating the EM field by using a pair of electrodes coupled to receive the output current.

14. The method as recited in claim 13, further comprising varying the selected portion of the sinusoidal wave that is rectified by the control circuit varying timing of control signals used to activate selected ones of a plurality of SCRs in the SCR circuit.

15. The method as recited in claim 13, further comprising:
receiving, in a step-down transformer of the sub-sea EM source, a sinusoidal source wave;
generating, using the step-down transformer, the sinusoidal wave based on the sinusoidal source wave; and
providing the sinusoidal wave to an input of the SCR circuit and an input of the control circuit.

16. The apparatus as recited in claim 1, wherein the sub-sea EM source is configured to receive three-phase alternating current (AC) power and further includes:
first, second, and third step-down transformers configured to step down voltages of first, second, and third phases, respectively, of the AC power, wherein the SCR circuit is configured to rectify portions of first, second, and third sinusoidal waves corresponding to the first, second, and third phases of the AC power, respectively.

* * * * *